June 16, 1931.    W. GALLAHAN    1,810,703
SOUND RECORDING SYSTEM
Filed May 3, 1928
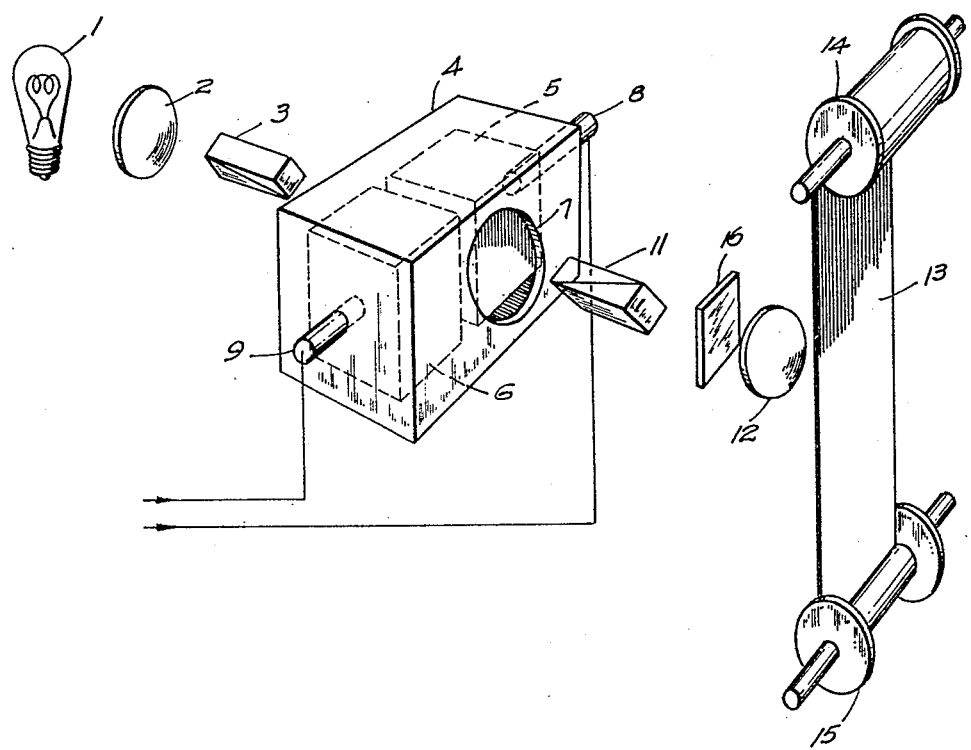
INVENTOR
Walter Gallahan.
BY
ATTORNEY Patented June 16, 1931

1,810,703

UNITED STATES PATENT OFFICE

WALTER GALLAHAN, OF WILKINSBURG, PENNSYLVANIA, ASSIGNOR TO WESTINGHOUSE ELECTRIC & MANUFACTURING COMPANY, A CORPORATION OF PENNSYLVANIA

SOUND RECORDING SYSTEM

Application filed May 3, 1928. Serial No. 274,732.

This invention relates to the photographic recording of sound and particularly to systems in which the sound to be recorded is caused to produce a difference of potential across a Kerr cell to thereby vary the amount of light passing through a polarizing and analyzing system.

A method of recording sound, which has now come to be well known, comprises impressing across the electrodes of a Kerr cell potentials derived from the sound by means of a microphone and a system of amplifiers. A source of light illuminates the Kerr cell through a Nicol prism or other polarizing device, whereby the light which traverses the space between the electrodes of the cell is plane polarized. A second Nicol prism is placed on the other side of the Kerr cell and so positioned relative to the first Nicol prism that ordinarily no light emerges from the second Nicol prism.

As the potential difference between the electrodes of the Kerr cell is varied, light emerges from the second Nicol prism. The intensity of the light which emerges is proportional to the change in the electric field in the Kerr cell. The intensity of this light, therefore, corresponds to the sound, and a record of the sound is obtained by receiving this light upon a photographic film.

The action of the Kerr cell upon the light is ordinarily spoken of as a rotation of the plane of polarization of the light. This is not an accurate description of the action, but no misapprehension of the invention described herein will result from calling this action by its familiar name.

It has been found that, when the polarized light delivered to the Kerr cell is white light or a light comprising many colors mingled together, the rotation is of different magnitudes for the different colors. When such light emerges from the second Nicol prism, instead of corresponding strictly and definitely to the sound, it will correspond thereto approximately and in a more or less blurred fashion, because of the different degree of effectiveness of the Kerr cell for different colors.

It is an object of this invention to avoid the disadvantage which results from the different action of the Kerr cell upon different colors.

It is a further object of this invention to obtain a photographic sound record with more clear-cut and definite representation of the sound than has heretofore been possible.

It is a further object of this invention to restrict the light used in making a sound record to a portion of the spectrum over which the action of the Kerr cell is substantially independent of the wave length.

It is a further object of my invention to overcome the undesirable effects of the yellowish color of the nitro-benzol used in the Kerr cell.

Further objects of the invention will be apparent from the following detailed description and the accompanying drawing, in which the single figure is a view, partly diagrammatic and partly perspective, illustrating the optical apparatus.

In the drawing, 1 is any convenient source of light which, by means of the lens 2, is concentrated into a substantially parallel beam. The beam passes through a Nicol prism 3 by means of which the light is rendered plane polarized.

A Kerr cell 4 includes a pair of electrodes 5 and 6 with a narrow space between them so positioned that the light from the Nicol prism 3 will pass through said space. Windows, of which one is shown at 7, are provided to permit the passage of the light.

Terminals 8 and 9 are connected, respectively, to the electrodes 5 and 6. By means of the terminals, a difference of potential may be impressed upon the electrodes corresponding to the sound to be recorded. The means for converting the sound into electrical-potential changes constitutes no part of the present invention and is not illustrated.

A second Nicol prism 11 is positioned in the path of the beam of light, on the opposite side of the Kerr cell from the Nicol prism 3. The Nicol prism 11 is so positioned that, normally, the combined action of the two Nicol prisms permits no light to pass.

A lens 12 is located in the path of the light beam and brings whatever light emerges from the Nicol prism 11 to a focus upon a photographic film 13. The spools 14 and 15 are intended to indicate that any suitable provision is made for continuously moving the film 13 during the making of a record.

At any point in the path of the light beam, a color screen 16 is inserted. As illustrated, this screen is located between the Nicol prism 11 and the lens 12, but it may equally well be positioned at any point between the light source 1 and the photographic film 13.

In the operation of the device, light from the source 1 is concentrated into a beam by means of the lens 2 and rendered plane polarized by the Nicol prism 3, the plane of polarization preferably being at an angle of 45° to the direction of the electro-static field in the Kerr cell.

The intensity of the electrostatic field is varied in accordance with sound by any known means. The usual and well known provision of a biasing potential to establish a permanent field upon which said variation is superposed may be included in said means, if desired.

The light, after passing through the Kerr cell, is no longer plane polarized but elliptically polarized and, consequently, a portion of it will pass through the Nicol prism 11. This is the action ordinarily described by saying that the Nicol prism rotates the plane of polarization.

The action of the Kerr cell is more effective for certain colors than for others. Stated in usual language, the cell rotates the plane of polarization more in the case of certain colors than in the case of others. Light of one color will reach the film during a longer fraction of the period of the sound than light of another color. The resulting record upon the film 13, instead of consisting of sharp and well defined lines corresponding to the successive maxima of the sound pressure, will be composed of lines with more or less blurred and indistinct edges.

The color screen 16 cuts off from the light reaching the film 13 all colors which differ materially from those for which the screen 16 is transparent. The colors for which the screen 16 is transparent do not differ from each other in wave length enough to result in any substantial difference in action of the photo-cell upon the several wave lengths. The effect upon the photographic film 13 is, therefore, the same as if the light supplied from the source 1 were monochromatic.

I have found that, for the screen 16, material transparent to blue light is most convenient. This filter may very well be a piece of gelatin, such as is used for moving-picture film dyed blue by means of aniline dye.

The optically active liquid most frequently used in the Kerr cell is nitro-benzol which has a natural yellow color and, for this reason, tends to increase the blurring effect of yellow light on the record. The blue filter, by cuting off yellow rays, counteracts this tendency.

Instead of the color screen described, a source of monochromatic light may be used. A gas-filled glow tube of the type which produces a blue light may be substituted for the light source 1 for this purpose. An even better result may be obtained by using such tube for a light source and also using a color screen.

It will be apparent to those skilled in the art that many other applications of this invention may be made and many details of the structure may be varied without departing from the spirit of this invention. No limitation, therefore, is intended except such as is required by the prior art or is indicated in the claim.

I claim as my invention:

In a system of photographic recording, incorporating a Kerr cell of the type utilizing nitro-benzol for a dielectric, a color filter transparent to blue light adapted to compensate for the yellow color of said nitro-benzol.

In testimony whereof, I have hereunto subscribed my name this 12th day of April, 1928.

WALTER GALLAHAN.